Jan. 24, 1967 D. H. SHEPARD 3,300,586

CONVERSATION MACHINE

Filed Nov. 5, 1963 6 Sheets-Sheet 1

INVENTOR
DAVID H. SHEPARD

BY Cushman, Darby & Cushman
ATTORNEYS

INVENTOR
DAVID H. SHEPARD
BY Cushman, Darby & Cushman
ATTORNEYS

Jan. 24, 1967 D. H. SHEPARD 3,300,586

CONVERSATION MACHINE

Filed Nov. 5, 1963 6 Sheets-Sheet 3

INVENTOR
DAVID H. SHEPARD

BY Cushman, Darby & Cushman
ATTORNEYS

INVENTOR
DAVID H. SHEPARD

BY Cushman, Darby & Cushman
ATTORNEYS

Jan. 24, 1967 D. H. SHEPARD 3,300,586

CONVERSATION MACHINE

Filed Nov. 5, 1963 6 Sheets-Sheet 5

INVENTOR
DAVID H. SHEPARD

BY Cushman, Darby & Cushman

ATTORNEYS

Jan. 24, 1967 D. H. SHEPARD 3,300,586

CONVERSATION MACHINE

Filed Nov. 5, 1963 6 Sheets-Sheet 6

INVENTOR
DAVID H. SHEPARD

BY Cushman, Darby & Cushman
ATTORNEYS

United States Patent Office
3,300,586
Patented Jan. 24, 1967

3,300,586

CONVERSATION MACHINE

David H. Shepard, Rye, N.Y., assignor to Cognitronics Corporation, Briarcliff Manor, N.Y., a corporation of New York Filed Nov. 5, 1963, Ser. No. 321,584
20 Claims. (Cl. 179—6)

Figures 1, 1A:
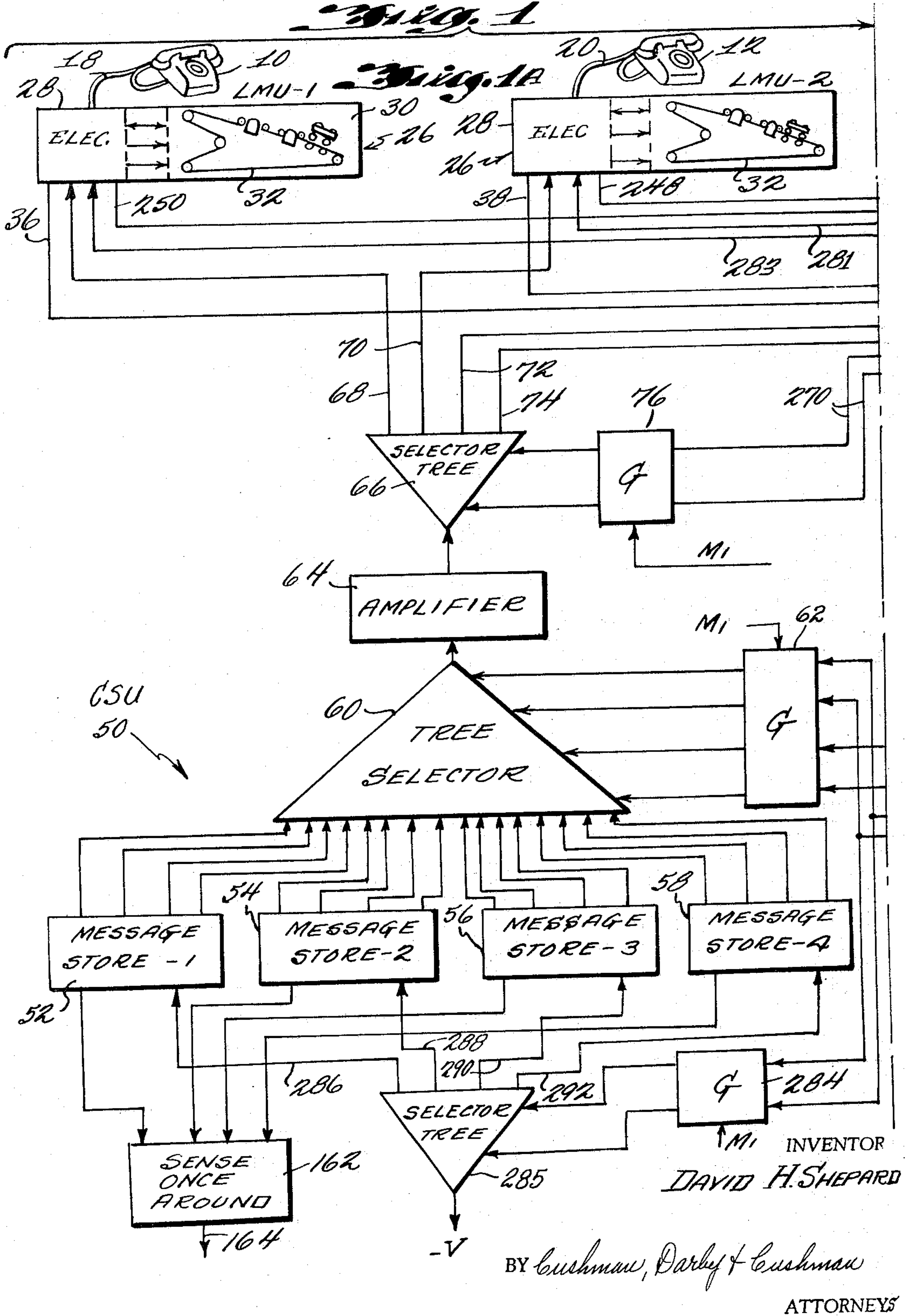

This invention relates to general purpose information retrieval systems, and in particular to equipment and a method for conversing via a link which carries information into the equipment and receives selected messages therefrom.

More specifically, this invention relates to equipment for conversing with at least one person whose verbal statements are received by the equipment over an electrical line, which also carries the appropriate machine messages back to that person. The equipment is especially useful with a telephone system, and the detailed description of the equipment is set forth in that environment, though limitation thereto is not appended. There are numerous situations in which the conversing equipment may be utilized, the one discussed below being that of a telephone answering service. Additionally, the equipment can be used in inventory systems, or in systems where it is necessary to determine whether a certain part has even been made or used by the company for any purpose. This latter type question becomes quite prominent in large companies, particularly those which have multiple divisions operating in diversified fields which can possibly overlap in small areas of endeavor. Still other type situations are imaginable for use, in which the equipment and method of this invention may be employed and limitation to the above situations is not to be inferred.

It is the main object of this invention to provide equipment and a method for effecting a conversation via a link which carries input information into the equipment and also carries output messages to the source of the input information.

Another object of the invention, in conjunction with the preceding object, is the provision in such equipment of a means for providing output signals that are indicative of an understanding of the received information, along with means for supplying messages to that link selectively in accordance with those output signals.

The preceding objects contemplate either fully automatic equipment or equipment which utilizes a human operator to understand the incoming information when it is in the form of verbal statements. In the fully automatic equipment, there is a voice recognition unit which has a certain audio intelligence recognition ability and includes a means switchable to various conditions in accordance with its understanding of the various received statements. In the semi-automatic equipment, a human operator listens to the incoming statements and presses certain switches to initiate the output signals, which uniquely represent the operator's understanding of the received statements.

In either of those versions of the equipment, there is a central storage unit which stores a plurality of predetermined messages that are selected in accordance with the last understood statement and readout to the person who initiated that statement. To effect this operation of the equipment, a memory unit is employed for purposes of control and programming. The overall control system includes that memory which in the detailed embodiment includes a magnetic drum, along with registers for keeping track of the last message readout, the drum position, and the next message to be readout. The determination of that next message is based upon the contents of the last message readout in conjunction with the statement provided to the equipment by the person on the other end of the line in response to that last message. The program is prerecorded on a track of a drum and by using the combination of the last message and statement or answer thereto, the correct position of the drum is selected for readout for the next message designation.

In the described embodiment, the voice recognition unit is limited to distinguishing between the words "Yes" and "No," and also determines when the output audio information is "Other" than either of those words. The output of the voice recognition unit is a two digit binary number, with three of the four binary possibilities being employed to designate "Yes" or "No," and "Other." As above indicated, the next message to be played out is based on which of these three answers is detected, as well as on the contents of the last message readout back. For ease in determining the contents of the various messages that are stored in the equipment, each such message is given a number in binary form, which is the designation recorded on the drum at the appropriate place.

It is accordingly a further object of this invention to provide equipment of the type above described, which is either semi-automatic or fully automatic.

Figure 1B:
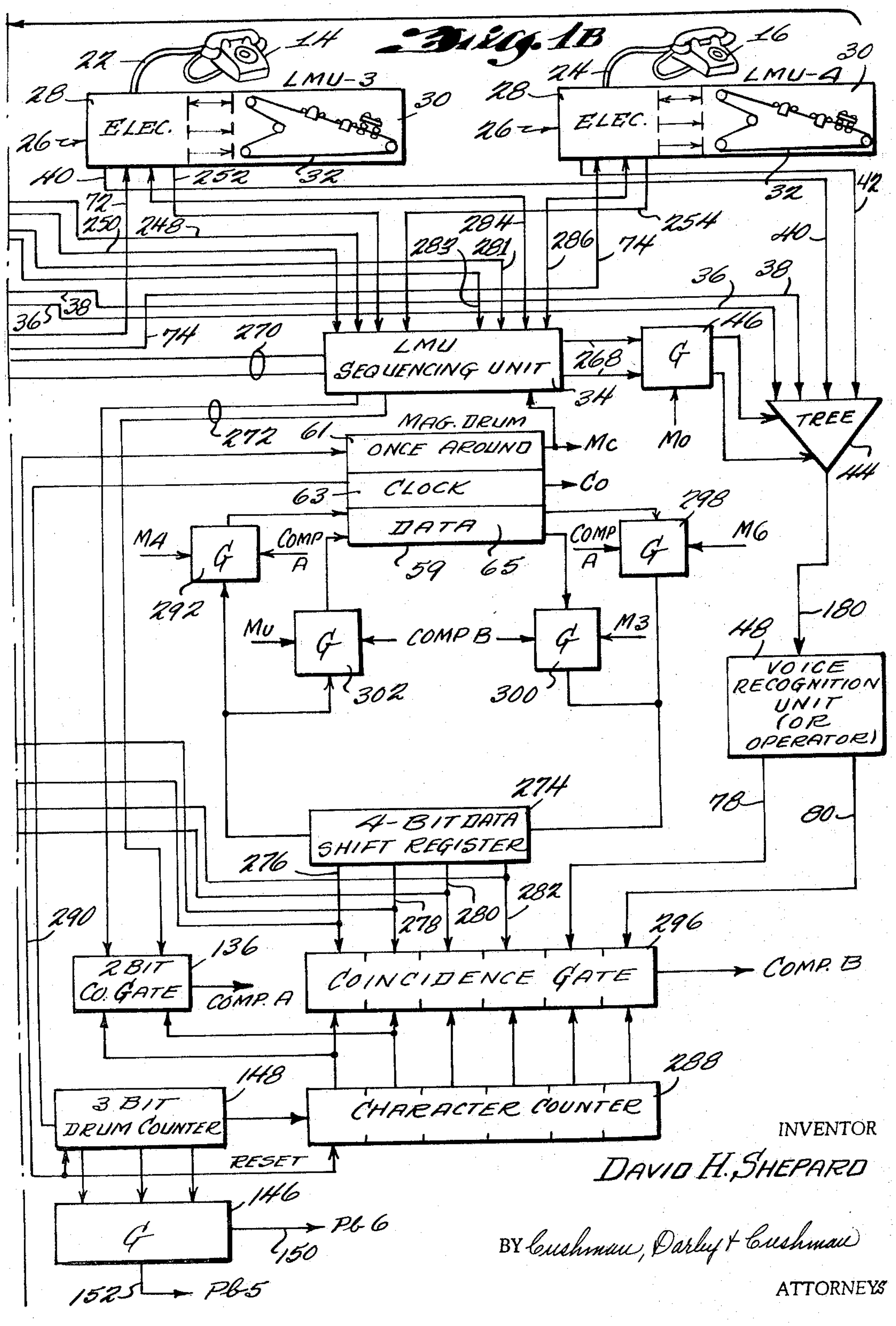
Figure 2:
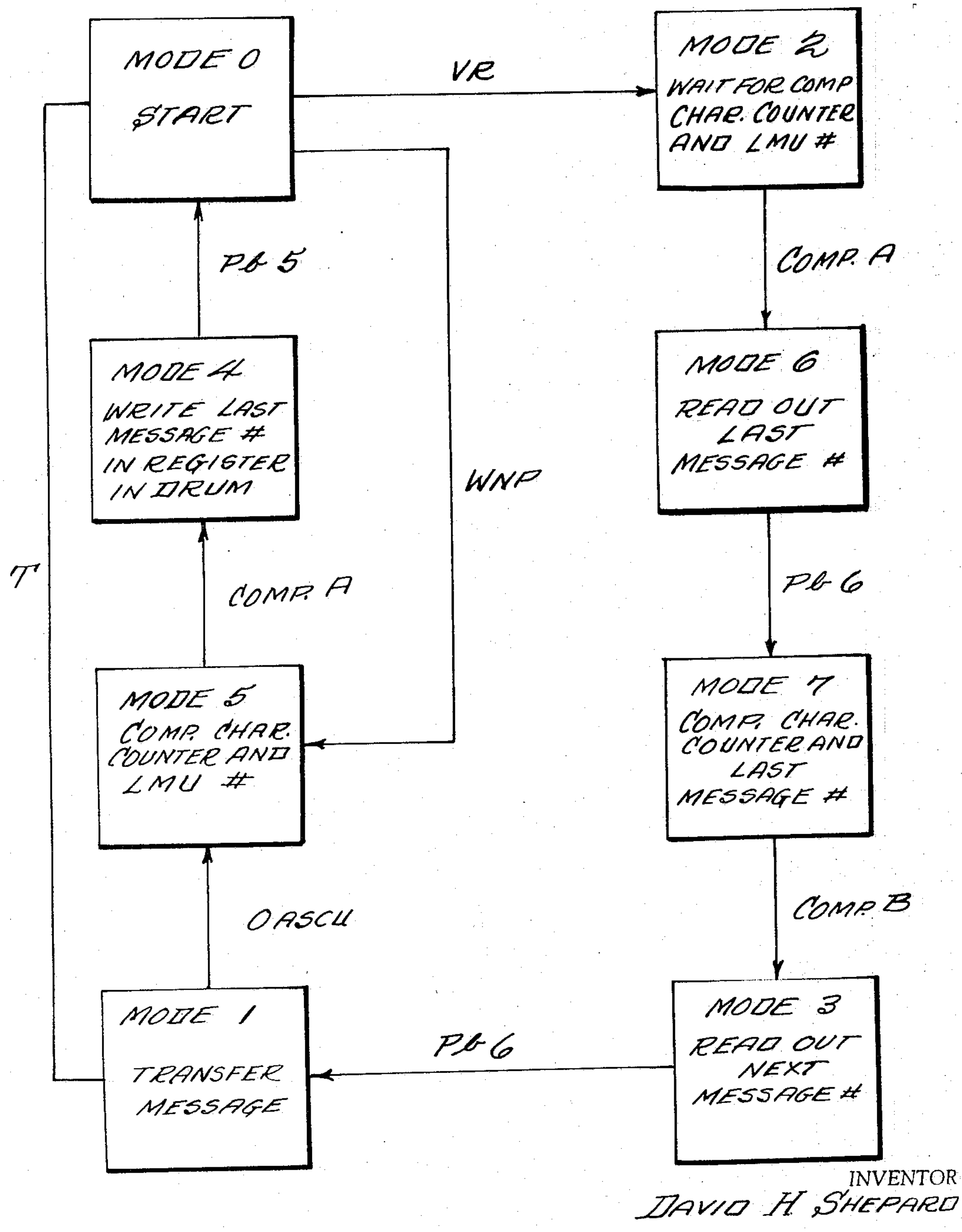
Figure 3:
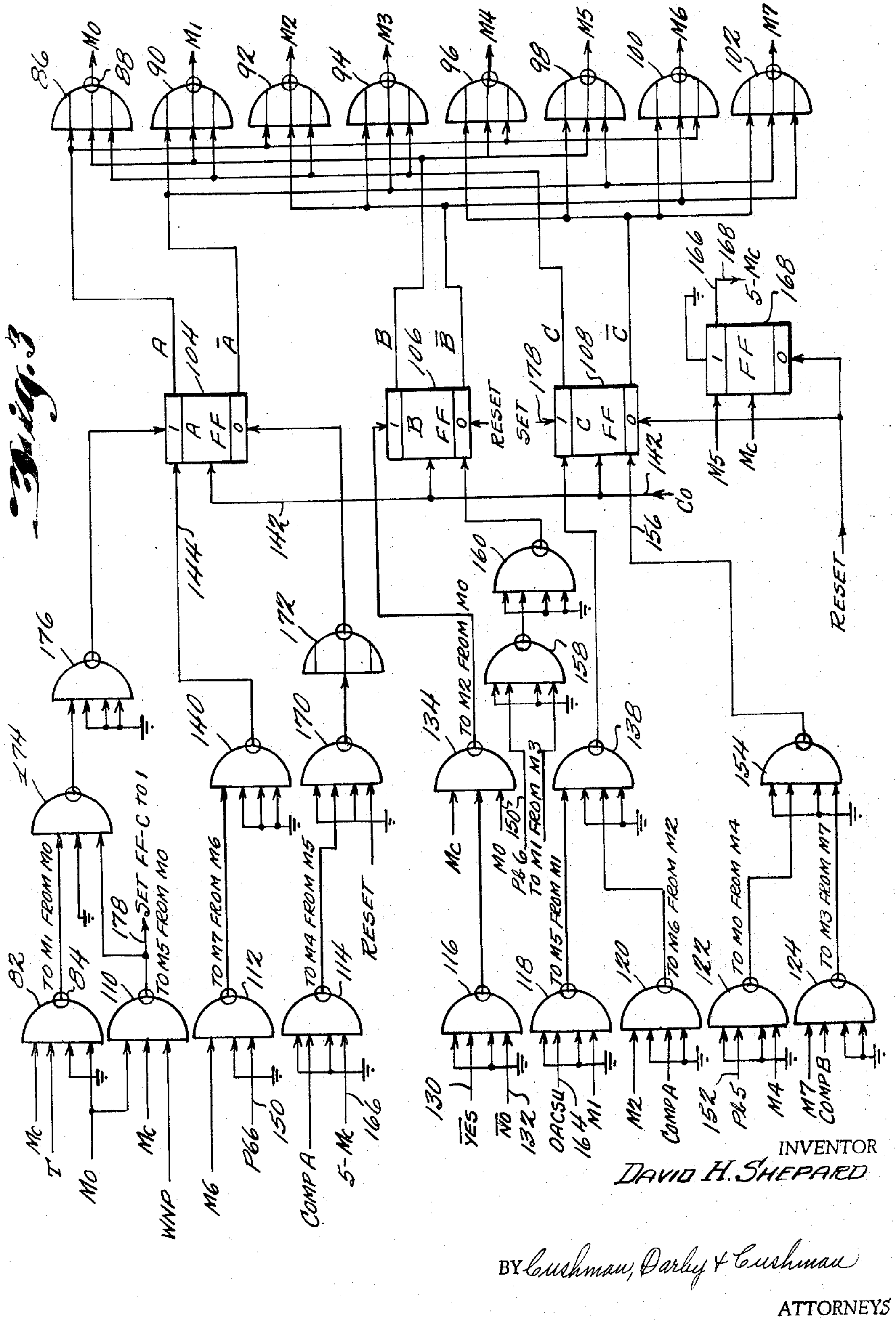
Figure 4:
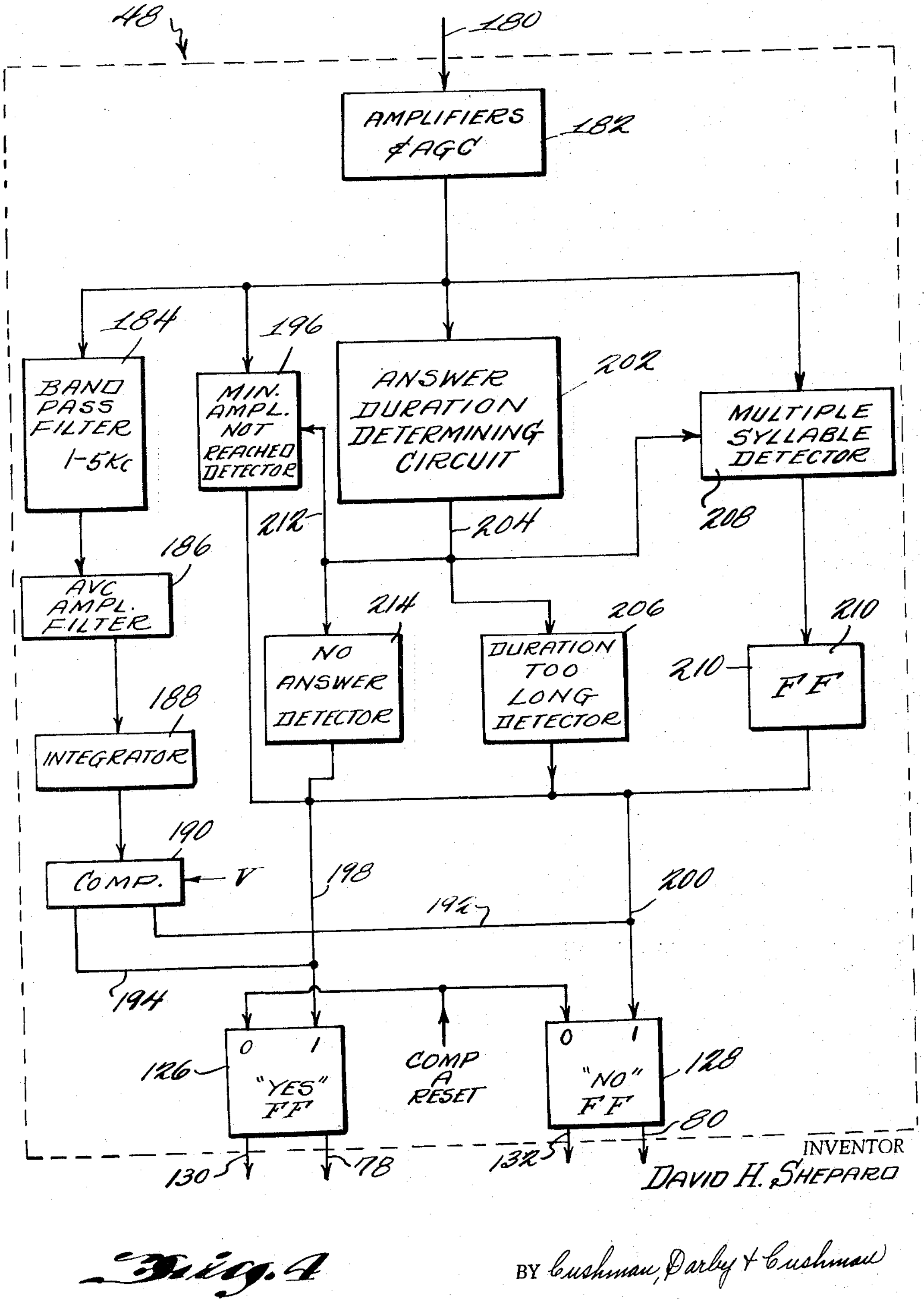
Figures 5, 6:
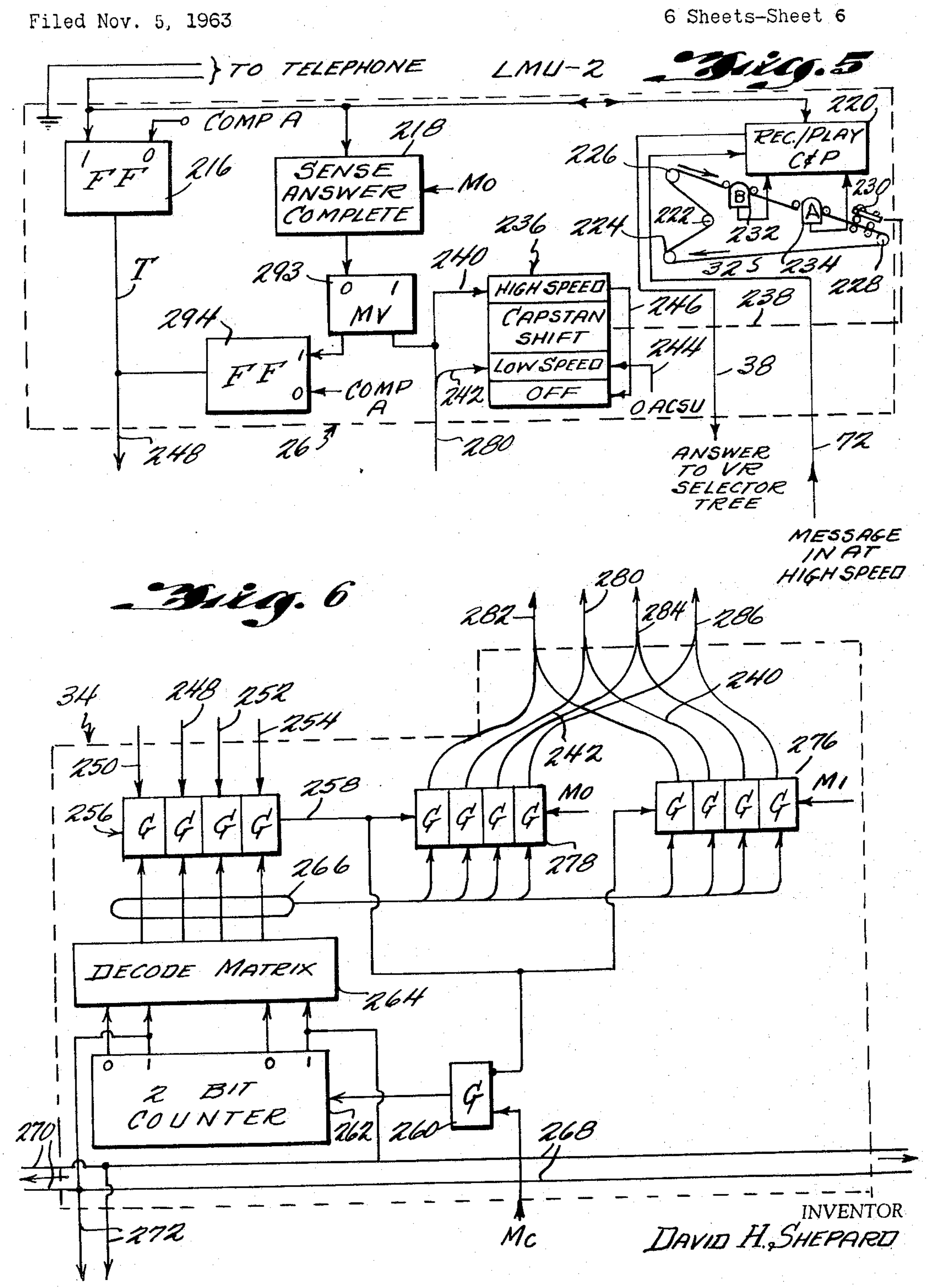

Other objects and advantages of this invention will become apparent upon reading the appended claims in conjunction with the following detailed description and the attached drawings, in which:

FIGURE 1, which is comprised of FIGURES 1A and 1B on separate sheets, is an overall block diagram of an embodiment of the invention, FIGURE 2 is a flow chart, FIGURE 3 is a schematic illustration of circuitry utilized with the equipment of FIGURE 1 to effect different modes of operation, FIGURE 4 is a detail of the FIGURE 1B voice recognition unit, FIGURE 5 is a detail of one of the line monitoring units in FIGURE 1, and FIGURE 6 is a detail of the LMU sequencing unit in FIGURE 1B.

FIGURE 1, which includes the two FIGURES 1A and 1B side-by-side, illustrates one embodiment of the invention in diagrammatic form. For purposes of illustration only, the equipment of FIGURE 1 is indicated as being connected to four different telephones 10, 12, 14 and 16. It should be understood, however, that the invention is capable of operating with just one telephone, or a multiplicity of such telephones for there is no limit to the number of connecting links or lines with which the equipment may be associated. As shown in FIGURE 1, these links or lines are designated 18, 20, 22, and 24. They could be radio links as well as telephone lines, "link" being considered generic to both.

As will become apparent, each of these lines to the different telephones carries not only the incoming messages from the telephone, but also messages from the equipment or machine itself to the person or persons at the various telephones. Each of the lines is connected to a respective line monitoring unit 26 which are respectively designated LMU 1, LMU 2, LMU 3, and LMU 4. Each of these line monitoring units includes an electronic section 28 and a tape record and playback section 30, which are interconnected as illustrated. Tape 32 is included in the latter section. The details of a line monitoring unit are discussed below with respect to FIGURE 5 during the discussion of the total equipment. In short, it is here indicated that each LMU has the purpose of monitoring its respective line and recording each incoming message or statement, playing that record out into the equipment to be "decoded" or understood, receiving the appropriate machine message, and playing that message out of the person calling in.

To aid the line monitoring units in their function, there is provided a LMU sequencing unit 34. Any statement telephoned in and recorded on the respective tape 32 is carried over a respective output line 36, 38, 40 and 42, to the selector relay tree 44. The appropriate one of those input lines to that tree is selected by the two bit output of gate 46, in a manner explained below. The verbal statement is then passed through tree 44 to the voice recognition unit 48.

Before proceeding further, it is appropriate to mention now that in the specific embodiment being vocabulary in that it understands only the words "Yes" and "No." From this it can be appreciated that the input to the voice recognition is then an "Answer" to a question, and as will be described more particularly below, that question comes from the machine itself. In other words, the statement received from the person on the other end of the line is an answer, but broadly speaking the invention is not limited in that respect. Instead, the invention contemplates the replacement of the voice recognition unit 48 not only by a human operator, who of course would have an almost unlimited vocabulary, but also by a more sophisticated electronic type unit which also has a much larger vocabulary. In any event, the term "statement" is to be considered generic to whatever type of word or word phrases are received from the telephone line.

In a like manner the term "message" as used with regard to this invention is considered to be generic to any type of word or word phrases including sentences of a declaratory or interrogatory nature, limitation thereto not being intended. To aid in distinction between that information which comes from a telephone line, which information is herein termed a "statement," the information which is prerecorded in the machine and sent out to those telephone lines is referred to as a "message." Either term is considered generic to the other and to information in general.

The messages which are prerecorded and inserted into the machine are stored in the central storage unit 50, which includes four individual stores 52, 54, 56 and 58. For purposes of illustration, these message stores may be tape decks with four different available messages each. In total then, the central storage unit 50 has 16 messages available respectively on the input lines to the selector tree 60. The output of this tree is determined by the combination of the four binary outputs from the message selector gate 62, and is applied via amplifier 64 to another selector tree 66. The latter tree routes the selected message to the proper one of the line monitoring units 26 via the respective input lines 68, 70, 72, and 74, in accordance with the two bit output signal from gate 76. This message is recorded on the tape 32 of that LMU, and then is played back to the person at the other end of the line. The sequence of a statement and further message is repeated until a desirable ending point.

In order to appreciate the ability of this machine possibly to a greater degree, consider as an example that the machine is listed in the telephone book under Antigua Tourist Center. Then, when anyone of the different lines 18, 20, 22, or 24 is carrying a ringing signal or the like, the machine immediately goes into operation to transfer its first message to the tape of that LMU unit, and then immediately to the person calling in, before that person can initiate a statement. The initial machine message could be for example "Are you seeking information on travel to Antigua?" To such a question, the answer will normally be "Yes" or "No." The machine may be programmed such that if the answer is "No," the machine will automatically give a message to the person that "A human will answer in 30 seconds, but meanwhile please record your message." On the other hand, if the answer to the initial question is "Yes," then the machine may be programmed to transfer a message to the person such as "Are you in the travel business?" This question will be likely answered by the person "Yes" or "No." When the answer is such that the voice recognition unit 48, or a human operator which replaces that unit, cannot understand the answer to that question, or the initial question, then the voice recognition unit or the operator places the answer in an "Other" category, which means different signals will issue on the voice recognizer output lines 78 and 80. This will cause still a different message to be transferred to the customer. For example, the message "I did not understand your answer. May I help you?" With an answer of "No" or one that is decoded "Other," the machine transfers to the customer the same message as for the "No" answer to the very first message. On the other hand, if the answer is "Yes," then the machine returns to the message above stated as to whether the customer is in the travel business. With a "Yes" answer to the travel business question, the machine reads out to the customer the question of "Would you like me to read a list of hotels and representatives." If so, the next message from the machine is a list of hotels and representatives. If the travel business question had been "No," then the machine would read out a message that says "It takes only 3¾ hours by jet to cover 1,400 miles from New York to Antigua. Do you want to know the entry requirements?" A "Yes" answer to that question might be followed by a message "To enter Antigua you need a smallpox vaccination certificate, a return airline ticket, and some means of identification such as a passport. Would you like me to repeat these requirements?" A "Yes" answer to that question would cause a repeat of that same message, while a "No" or "Other" answer to that message or to the previous message asking the customer if a reading of the hotels and representatives or of the entry requirements is desired, may cause a further message to be transferred to the customer saying "There are 600 rooms located on some of the world's best beaches in Antigua. Would you like us to send you hotel brochures and rate sheets?"

The programming can continue to be similarly arranged, with the final message from the machine being "Thanks for calling" if desired. Next to that message may be one which asks the customer to record his name and address, whereby further telephone or mail contact may be made with him to complete any desired business.

To accomplish its overall ability of operation, the machine has eight different modes during which different operations are accomplished each cycle. These different modes and their functions are indicated diagrammatically in FIGURE 2, and the apparatus for generating the different mode signals is shown in FIGURE 3. A description of how the conversation machine operates in each of these modes is set forth below, and now reference is made to FIGURE 3 to indicate how each of the eight modes starting and holding signals M0 . . . M7 is derived. The circuitry in FIGURE 3 utilizes And-Not and Or-Not logic with half-moon symbols such as that designated 82 referring to an And symbol the output of which is inverted as indicated by the small circle 84, to form an And-Inverter. In like manner, symbol 86 refers to an Or circuit whose output is inverted as indicated by the small circle 88, to form an Or-Inverter. Of course, instead of the inverter-type logic illustrated in FIGURE 3, noninverting logic may be employed in a manner well known in the art.

The eight different mode signals M0 . . . M7 are respectively obtained from the Or-Inverter circuits 86, 90, 92, 94, 96, 98, 100 and 102. The inputs to these Or-Inverter circuits are obtained from the three flip-flops 104, 106, and 108. These flip-flops are respectively also designated A, B, and C, with the one output from the A flip-flop being designated "A" and the zero output therefrom being designated "$\overline{A}$," etc., for the other flip-flop outputs, as shown. The six output signals from these three flip-flops, A, $\overline{A}$, B, $\overline{B}$, C, and $\overline{C}$, are combined in unique manners to obtain the eight different combinations thereof, whereby the eight mode signals M0 . . . M7 result. As an exemplary way of combining the flip-flop output signals, the illustration in FIGURE 3 shows that mode signals M0 results from the combination of CBA, which in turn may be said to represent the binary number 111. On the other hand, the mode 7 signal M7 is obtained by the flip-flop combination $\overline{C}$ $\overline{B}$ $\overline{A}$, which may be said to represent the binary number 000. The other mode signals M6 . . . M1 follow a true binary count upwards from 000, meaning that mode signal M6 results from the combination $\overline{C}$ $\overline{B}$ A, M5 from the combination $\overline{C}$ B $\overline{A}$, M4 from the combination $\overline{C}$ B A, M3 from the combination of C $\overline{B}$ $\overline{A}$, M2 from the combination C $\overline{B}$ A, and M1 from the combination C B $\overline{A}$.

To obtain each of these different conditions of the flip-flops 104, 106, and 108, a variety of predetermined inputs to And-Inverter circuits 82, 110, 112, 114, 116, 118, 120, 122, and 124 are employed. From FIGURE 2 it is indicated that one mode into which the machine may go from mode 0, is mode 2. This is indicated as being on the occurrence of the VR signal, which means the voice recognition unit output signals.

As later described in more detail relative to FIGURE 4, which diagrammatically illustrates an exemplary embodiment of the voice recognition unit, there are two switchable means such as the flip-flops 126 and 128 illustrated therein, for stating the "Yes" and "No" answers. Besides the "1" output lines 78 and 80 which are also shown in FIGURE 1B, these flip-flops have respective output lines 130 and 132, which connect to the And-Inverter circuit 116 in FIGURE 3. Normally, because flip-flops 126 and 128 are usually in a resting condition wherein their states are "0" and "0" respectively, both of the flip-flop outputs on lines 130 and 132 are high, indicating that there is no answer determined yet. If either of those outputs is reduced to its low level, however, the And-Inverter circuit 116 in FIGURE 3 will then provide a high level output. This output, in conjunction with the mode 0 signal M0 and the once around signal $M_c$, operate the And-Inverter 134 to set flip-flop 106 to its "1" state and change the mode to mode 2.

As indicated in FIGURE 2, the next mode is mode 6. To effect this change from mode 2 to mode 6, a signal called "COMP A" is utilized. This signal is obtained in a manner later described, from the two bit coincidence gate 136 in FIGURE 1B. As shown in FIGURE 3, the combination of mode signal M2 and the COMP A signal as inputs to And-Inverter 120 operates through And-Inverter 138 to set flip-flop 108 to its "1" state. This causes an ouput from Or-Inverter 100, thereby providing the mode 6 output signal M6.

To shift to the next mode, which is shown by FIGURE 2 to be mode 7, FIGURE 3 illustrates by its inputs to And-Inverter 112, that the combination of mode signal M6 and playback signal P*b*6 are required. The output of And-Inverter 112 is inverted by the And-Inverter 140 and delivered as a level to the "1" input side of flip-flop 104. Upon the next occurrence of the clock signal $C_0$ on line 142, which signal is obtained from the clock track of the magnetic drum in FIGURE 1B, flip-flop 104 is triggered to its "1" state due to the simultaneous presence of that clock signal and the level on line 144. This causes an output signal then from Or-Inverter 102, which provides the mode 7 signal M7.

In the preceding paragraph a playback signal P*b*6 was utilized as an input to the And-Inverter circuit 112. This signal is obtained from the gating circuit 146 in FIGURE 1B. As later indicated in more detail, there are eight bit spaces reserved in the data track on the magnetic drum, and the three bit drum counter 148 effectively counts the representative of those spaces, the clock pulses, as the drum revolves. Gate 146 is connected to that counter as shown, to designate on its output line 150 when the sixth one of those bit spaces has occurred. This is the playback signal P*b*6. For other purposes later described, gate 146 also indicates on line 152 the occurrence of the fifth such playback signal P*b*5.

With the equipment in mode 7, FIGURE 2 indicates that the next mode is mode 3, and that a COMP B signal is utilized to effect the switching. In FIGURE 3, And-Inverter 124 receives the mode 7 signal M7 in conjunction with the COMP B signal (derivation of which is described below) and through an And-Inverter 150 provides a level on line 156 to the "0" input side of flip-flop 108. Therefore, when the next clock pulse $C_0$ arrives on line 142, flip-flop 108 is reset to its "0" state. This causes an output signal from Or-Inverter 94, indicating that the machine is now in mode 3.

Reference to FIGURE 2 shows that transfer out of mode 3 into mode 1 is effected by use of the playback signal P*b*6 again. In FIGURE 3, And-Inverter 158 receives the mode 3 signal M3 along with playback signal P*b*6 on line 150′ (which is the same as line 150 from gate 146 in FIGURE 1B). The combination of these signals is inverted by And-Inverter 160, and applied to the "0" side of flip-flop 106. The subsequent occurrence $C_0$ on line 142 then switches the flip-flop 106 to its "0" state. This places the equipment in mode 1 with Or-Inverter circuit 90 issuing the M1 mode signal.

For purposes of shifting from mode 1 to mode 5, FIGURES 2 and 3 indicate that a signal designated OACSU is employed. This signal refers to the movement of the tapes in the central storage unit 50 of FIGURE 1A once around, i.e., a Once Around Central Storage Unit signal. As shown in FIGURE 1A, this signal is sensed by circuit 162 and appears on line 164. In FIGURE 3, the signal on this line, in conjunction with the mode 1 signal M1, is delivered to the And-Inverter 118 the output of which passes through And-Inverter 138 to the "1" side of flip-flop 108. The flip-flop is triggered then to the "1" state upon the occurrence of the clock signal $C_0$ on line 142. This causes the mode 5 output signal M5 to occur from the Or-Inverter circuit 98.

FIGURE 2 indicates that the COMP A signal is again employed, this time to shift the equipment from mode 5 into mode 4. It will be recalled that this COMP A signal is obtained, in a manner yet to be described, from the two bit coincidence gate 136 in FIGURE 1B. In FIGURE 3, the COMP A signal is now utilized at And-Inverter 114 with another signal termed 5–M$_c$. This signal is on line 166, which is also the output line of flip-flop 168. This flip-flop received the mode signal M5 as a level, but stays in its "0" state (due to prior resetting) until the once around signal $M_c$ from the magnetic drum in FIGURE 1B triggers the flip-flop to its "1" state. Then, the COMP A signal and the 5–$M_c$ signal operate through And-Inverters 114 and 170, and through the Or-Inverter 172, to trigger flip-flop 104 to its "0" state. This switches the equipment to mode 4, and Or-Inverter circuit 96 supplies the M4 mode signal.

To complete the cycle as shown in FIGURE 2, playback signal P*b*5 is employed to shift from mode 4 to mode 0. This playback signal is obtained, as will be recalled, from gate 146 in FIGURE 1B, on line 152. In FIGURE 3 the signal on line 152, in conjunction with the mode signal M4, operates And-Inverter 122, and through And-Inverter 154 provides a level on line 156 to the "0" input side of flip-flop 108. The next $C_0$ clock pulse on line 142 triggers this flip-flop to zero, causing an output signal M0 from Or circuit 86.

The cycle just described, from mode 0 through mode 2, etc., back to mode 0, is the cycle of operation which the present equipment goes through after it has initially received its first statement from the person calling in.

When a call is initiated however, there is the requirement that the machine have the first word, instead of the person on the other end of the line. This is in order to get the conversation properly initiated from the machine's standpoint. Initially therefore, modes 2, 6, 7, and 3 are not used. It is first necessary to transfer a message from the machine to the person calling in, so that there can be information to which the caller can provide an answer or other type statement of the kind on which the machine can then operate. In FIGURE 2, it may be noted that mode 1 comes into operation upon occurrence of a "T" signal which shifts the machine out of mode 0 as described below. This signal may be thought of as a trigger signal such as may result from the ringing signal or a high level signal which results on a telephone line when the receiver is lifted. In FIGURE 3, this T signal is applied to an And-Inverter 82, along with the mode signal M0 and the drum once around signal $M_c$. The output of this And-Inverter is applied through to other And-Inverters 174 and 176 to trigger flip-flop 104 to its "1" state. This causes an output from Or-Inverter circuit 90, placing the equipment in mode 1. From there, the prior described changes to mode 5, then to mode 4, and back to mode 0 occur in the same manner as above indicated.

There is also the provision in this equipment of means to write a new program into the data track of the magnetic drum. As shown in FIGURE 2, the equipment is shifted from mode 0 to mode 5 upon the occurrence of a write a new program (WNP) signal. A derivation of this signal is not described, but it can of course be supplied in any convenient manner well known to the art. In FIGURE 3, the WNP signal is applied to And-Inverter 110 along with the mode signal $M_0$ and the drum once around signal $M_c$. The output from this And-Inverter is used via line 178 to set flip-flop 108 to its "1" state, and also through And-Inverters 174 and 176 to set flip-flop 104 to its "1" state. Upon the completion of mode 5, a COMP A signal occurs and the equipment switches to mode 4, then back to mode 0 as previously described.

Before proceeding into a fuller description of the operation of the equipment illustrated in FIGURE 1, the description of the voice recognition unit in FIGURE 4 is now completed. As will be recalled, the vocal statement received from the person calling is supplied to the voice recognition unit for a determination thereby of the contents of that statement. The understanding accomplished by the voice recognition unit, in the particular embodiment being described, is limited to within a certain audio intelligence ability, which specifically is the ability to determine whether an incoming statement is "yes" or "No," or neither of these. In particular, the incoming statements as received on line 180 in FIGURE 4 are amplified and subjected to automatic gain control as indicated at 182. This amplified and controlled audio signal is fed into a band pass filter 184 having a pass band between the frequencies of 1 kc. and 5 kc. The resultant band limited signal is then applied through a series of AVC circuits and amplifiers 186 to produce a rectangular audio envelope of unit amplitude. Circuit 186 includes another lowpass 1.5 kc. filter for further band limiting purposes to get an output that is in the 1 to 1.5 kc. band. Since unit amplitude is established, the output of circuit 186 is effectively the result of a comparison of the energy in the 1–1.5 kc. band to the energy in the 1–5 kc. band, thereby compensating for different volume levels. The output of circuit 186 is applied to an integrator 188, with the output of the integrator being applied to a comparison circuit 190. This circuit receives on another input a predetermined voltage V. It has been determined that the word "No" contains much more energy in the 1–1.5 kc. region than does the "Yes," regardless of by whom the words are spoken. Therefore, if the integrated 1–1.5 kc. signal is greater than voltage V, a signal is generated on line 192 to set the "No" flip-flop 128 to its "1" state.

This leaves the flip-flops 126 and 128 respectively in "0" and "1" states, meaning a "No" answer has been detected. On the other hand, if the integrated signal has an amplitude less than voltage V, a signal is applied over line 194 to the "1" input of the "Yes" flip-flop 126. This causes the flip-flops to be in "1" and "0" states respectively, meaning that a "Yes" answer has been detected.

Voice recognition unit 48 in FIGURE 4 is also capable of detecting when the incoming statement is too soft spoken or for some other reason has not reached a minimum amplitude. Detector 196 makes this determination, and if the minimum amplitude has not been reached it applies a signal over lines 198 and 200 to trigger both flip-flops 126 and 128 to their "1" states. This condition of the flip-flops means that neither "Yes" nor "No" has been detected by the unit, generically speaking, that something "other" than those words have been detected.

Besides the minimum amplitude not being reached, it is also possible to detect that an answer is longer than either one of the words "Yes" or "No." To determine this type of improper answer, circuit 202 in FIGURE 4 is employed to measure the length of the answer. This circuit provides on line 204 a rectangular wave output indicating the answer length to detector 206, which in turn provides an output to lines 198 and 200 when a predetermined duration is exceeded. Again, this output sets both of the flip-flops to "1" states.

A further way the voice recognition unit 48 in FIGURE 4 notes improper answers is by detecting the occurrence of multiple syllables in the answers. The input to detector 208 from circuit 182, when there is more than one syllable, has a separate envelope for each syllable. If multiple envelopes occur during the time period of the rectangular wave on line 204, a signal is applied to flip-flop 210 for storage purposes. Flip-flop 210 applies signals over lines 198 and 200 to set the flip-flops 126 and 128 to their "1" states when such detection occurs.

Still another way of detecting incorrect answers, specifically when there is no answer, is to detect the absence of a signal on line 204 for a predetermined time period. If no answer was received, then the absence of a signal on line 204 for a set time period was detected by circuit 214. The output of detector circuit 214 triggers both flip-flops to their "1" states, meaning that, if anything, something other than the "Yes" or "No" answers required has been given.

Flip-flops 126 and 128 may be reset to their 0 states after the decoding of an answer, in any desirable way, for example by using a COMP A signal the derivation of which is described below.

With the foregoing explanation of the voice recognition unit 48 in mind, an understanding of the operation of the FIGURE 1 circuit, in conjunction with FIGURES 5 and 6 can now be undertaken. In FIGURE 1, it will be recalled that there are four line monitoring units 26 shown. Each of the LMU's is exactly the same internally, and the details of one such unit is illustrated in FIGURE 5 in block form. It will be noted that one of the telephone lines 20 is grounded, while the other is applied to one input of flip-flop 216. This line extends as line 215 and connects as an input to a circuit 218, and further to a circuit 220. The latter circuit is a conventional record/playback circuit such as may be found in most tape recorders. Line 215 is bidirectional in nature, in that it carries incoming statements of the record to playback circuit 220 and then on to tape 32, while it also carries messages from tape 32 and circuit 220 back to the telephone connected to line 20. As illustrated, tape 32 moves in the direction of the arrows over corner rollers 222, 224 and 226 and around a tension roller 228. The tape is dual track and driven by a dual speed capstan 230 over two different transducers or heads 232 and 234 both of which can read or write on both tape tracks. The mechanism and circuitry for shifting capstan 230 between high and low speeds and off is diagrammatically indicated at 236, which is connected to the capstan as indicated by dash line 238. Whenever the high speed section of the capstan shift circuit is energized by a signal on line 240, tape 32 is shifted into high speed movement. Similarly, energization of the low speed section of circuit 236 by a signal on line 242 or on line 244, causes the capstan 230 to shift the tape to low speed. A signal from the high speed section over line 246 to the off section causes the tape to stop.

The detailed line monitoring unit in FIGURE 5 corresponds to LMU 2 of FIGURE 1A, in that the input and output lines in FIGURE 5 carry the designations that are peculiar to LMU 2.

As cutomary, whenever a telephone ringing signal comes over the line, or when that line is energized by the receiver on the other end being raised, the line carries an indicator signal in that it is activated to a high level, which triggers flip-flop 216 to its "1" state. This causes an output signal on its line 248, which may be considered the "T" signal previously mentioned with regard to the And-Inverter 82 in FIGURE 3. This signal is applied to the LMU sequencing unit 34. As shown in FIGURE 6, this line 248, along with the corresponding lines 250, 252, and 254 from LMU's 1, 3, and 4, respectively connect as input lines to a gating circuit 256 which includes four separate gates that have a common output line 258.

As previously explained, magnetic drum 59 has a track 61 which causes a single pulse to be generated once each revolution of the drum. This is the once around $M_c$ signal previously discussed, and as shown in FIGURE 6 this signal is applied to gate 260 and therethrough, normally uninhibited, to the two bit counter 262. Accordingly, counter 262 continuously counts the once around pulses of the drum, but such counting may be stopped by inhibiting gate 260 with a signal on line 258. A signal occurs on this line when the decoding matrix 264 causes an output on the one of its lines which is connected to the same one of the gates in circuit 256 as the energized one of the lines from the four LMU's. In other words, the four line binary count of counter 262 is changed by matrix 264 to a single signal on the proper one of the four output lines 266 corresponding to the instant binary count. It should also be noted that the two "1" output lines of counter 262 are connected to the gating lines 268, 270, and 272. As indicated in FIGURE 1, these gating lines are respectively connected to gates 46, 76, and coincidence gate 136.

In other words, upon receiving a T signal over line 248 in FIGURE 6, a two bit binary signal representing the LMU in question is provided on output lines 268, 270, and 272, these being determined by knowing the count of counter 262 at the time the decoded count coincides in one of the gates 256 with the energized input line, resulting in a signal on line 258 which inhibits gate 260.

From FIGURES 2 and 3 along with the prior explanations thereof, it is recalled that when the machine is in the waiting or starting mode designated 0 and a T signal is generated by an activated telephone line, the machine switches to mode 1. In FIGURE 1, the binary signals on line 270 from the LMU sequencing unit 34, cause selector tree 66, in the presence of the mode signal M1, to select the one of the tree output lines 68, 70, 72, and 74 that is connected to the same LMU that initiated the T signal. While this is happening, the four bit data shift register 274 in FIGURE 1B, which is resting in a predetermined registration, such as 0000, applies corresponding signals to its output lines 276, 278, 280, and 282. All four of these output lines are connected as inputs to gate 62, which is also energized by the mode signal M1. The first or left two of the shift register output lines 276 and 278 are also connected as inputs to another gate 284, which is energized by the mode signal M1 too. The output of gate 284 selects via selector tree 285 the one of the stores 52, 54, 56, and 58 in the central storage unit 50 that is to be driven, by applying respective drive signals on the proper one of lines 286, 288, 290, and 292. In this manner, the four messages that are associated with the selected storage unit are applied to selector tree 60. Since the present discussion centers about the first message, i.e., that message which is invariably delivered to the telephone upon receiving an initial indication therefrom that a conversation is to begin, the four zero bits initially in the shift register 274 not only cause the No. 1 message store to be selected, but also cause the No. 1 of those four messages to be delivered to amplifier 64. For example, message No. 1 of store No. 1 is selected automatically initially. The amplified message is routed by tree 66 to the appropriate one on lines 68, 72, and 74 in accordance with the two bit signal from gate 76.

It is to be emphasized that in accordance with the preferred embodiment illustrated, the messages from the central storage unit 50 are transferred out of the respective store from which it comes, at a speed which is substantially higher than the reel speed at which it is finally delivered to the person calling in. For example, every message from the central storage unit to any one of the line monitoring units is transferred at 16 times real time so that a 15-second message may be transferred in less than one second. This high speed transfer enables one central storage unit 50 to feed the same message and other messages to any number of LMU's in a matter of seconds. In order to cause the LMU tape to move at a high speed during the transfer thereto, the input on line 240 to the high speed section of capstan circuit 236 in FIGURE 5 is gated with a mode 1 signal M1, as shown in FIGURE 6. In other words, as soon as each of the four gates in circuit 276 are enabled with an M1 signal and the coincidence signal on line 258, line 240 therefrom is energized by the corresponding one of the matrix output lines 266. As illustrated, line 240 merges with line 242 from And circuit 278 to form a cable 281, which carries the signals to the associated LMU, as shown in FIGURE 5.

In like manner, cables 283, 284 and 286 are connected respectively to LMU's 1, 3, and 4. As soon as the message has been transferred from the central storage unit 50 onto tape 32 of the proper LMU, one revolution of the message tape in the central storage unit is sensed by circuit 162. This circuit generates an OASCU signal on output line 164, which is connected by line 244 in FIGURE 5 to the low speed section of the capstan shift circuit 236. This shifts the tape drive to low speed, which is real time, and the initial machine message just recorded on the tape is readout at the same speed immediately to the customer. The high speed transfer onto the tape is onto track A by head 234, which also effects the playback to the customer. While the customer is listening to the message, the other head 232 is monitoring track A also. The latter head is ahead of head 234, say by 2.5 inches, so head 232 will read the end of the message before the customer. Circuit 220 detects the end of the message and switches itself into a recording mode immediately at the end of the message from head 234. This prevents any part of the customer's answer, if it is returned quickly, from not being recorded. The answer is recorded by head 234 on track B. Before the recording mode is reached however, the machine has returned to mode 0, accomplishing several tasks enroute, as now described.

As will be recalled by reference to FIGURES 2 and 3 generation of the OACSU signal at the end of each message transfer causes shift of the equipment from mode 1 to mode 5. During mode 5, the number of the LMU, which initiated the conversation by way of generating the T signal, as it appears in binary form on line 272 in FIGURE 1B, is compared in the two bit coincidence gate 136 with the left two digits of the character counter 288 in FIGURE 1B. The present embodiment is arranged so that one character is 8 bits long, and consequently each cycle of the drum counter 148 updates character counter 288 by one. Accordingly, as the magnetic drum 59 revolves continuously, counter 148 counts the clock pulses $C_0$, and for every 8 such pulses applies an input signal to the character counter 288, both counters being reset by each once around signal $M_c$ from the drum as such occurs on line 290. As the character counter is updated, it will eventually come into coincidence with the bits on line 272 in gate 136. This comparison provides an output signal designated COMP A when coincidence occurs. The presence of this signal indicates the proper position or location on data track 65 of the magnetic drum where the number of the last message should be recorded. Accordingly, the COMP A signal is used not only to switch the machine to mode 4 as previously indicated, but also to get the information in the shift register 274 through gate 292 during the presence of the mode signal M4. This writes the information in the shift register at the proper position on the drum, and this information is designated the number of the last message transferred from the central storage unit to the LMU in question.

The COMP A signal is also used to turn off flip-flop 216 (FIGURE 5), ending the T signal on line 248 in FIGURE 6, thereby opening gate 260 again to let the once around drum pulses $M_c$ be counted again. This reinitiates the search in gating circuit 256 for another activated LMU which either needs a message from the machine or has one to transfer to the voice recognition unit. Because the equipment does not wait therefore, for a conversation via any one LMU to be completed, it can converse with any desired number of persons simultaneously by interleaving its operations therewith.

While modes 5 and 4 are being accomplished, the message is being transferred to the proper LMU tape. During the time that the four bits of data from shift registers 274 are being written on the drum at the proper location in mode 5, gate 146 is sensing coincidence for the fifth playback pulse, in other words, the fifth clock pulse during the time of that writing-in procedure. As previously indicated, this fifth pulse which occurs on line 152 in FIGURE 1B shifts the equipment into mode 0 wherein it can accept the customer's answer. Up until this time, the machine has not finished its transfer of the message which is on the tape, out to the customer. As soon as it does complete this readout, the tape stays in its low speed condition and waits for, or immediately takes, the customer's answer, as the case may be. As explained above, head 234 records the answer on track B. In FIGURE 5, circuit 218 is enabled by the mode signal M0, and this circuit operates to sense when the customer's answers is complete. It is capable of sensing a pause in the modulation, i.e., in the customer's answer, of 10 to 50 milliseconds, for example. When such a pause is sensed, a timing circuit, such as the one-shot or mono-stable multivibrator 293, applies a timed signal to the high speed section of circuit 236 in order to position the beginning of the taped answer exactly at the reading head. This is accomplished by letting the tape run only for a predetermined time at the high speed, following which a signal on line 246 turns the tape drive off automatically. Relaxation of circuit 293 to its stable state triggers flip-flop 294, causing line 248 to be activated again, this time following an answer from the person on the other end of the line. Accordingly, coincidence is again soon noted in FIGURE 6 by the appropriate one of gates 256, causing an output on line 258. This not only inhibits gate 260 and stops the counting by counter 262, but also applies an enabling signal to each of the four gates in circuit 278 which at the same time is also receiving the enabling mode signal M0. With gates 278 open, the corresponding one of lines 266 causes on line 242 an output which energizes the low speed section circuit in FIGURE 5. The tape then moves at a slow speed, playing back the customer's answer over line 38 to the selector tree 44 (FIGURE 1B) which precedes the voice recognition unit. This answer is then decoded in the voice recognition unit as previously described, causing the equipment to change to mode 2. As shown in FIGURE 1B, the output of the voice recognition unit on line 78 and 80 is connected to the fifth and sixth bits of a coincidence gate 296, and is used in a manner presently described.

Since it is necessary when carrying on a conversation, to know the contents of the last message, the machine now operates to place the last message designation, i.e., its designated binary number, in the first four bits of coincidence gate 296. It will be recalled that during mode 4 the last message number was written in regiser on the data track 65 of the drum, using a COMP A signal. Another COMP A signal is now obtained from coincidence gate 136 in FIGURE 1B when that same location is found on the drum again. Gate 136 compares the signal on lines 272, which designates the LMU from which the answer came, with the first two characters in counter 288 as it gets updated again by the clock pulse counter 148. The finding of the proper location on the drum where the last message number was written causes the COMP A signal to issue from gate 136. Besides resetting flip-flop 294 in FIGURE 5 so that counter 262 in FIGURE 6 can resume counting and effecting a scan of the LMU's for another that has an activated output line, it will also be recalled by reference to FIGURES 2 and 3, that the issuance of this COMP A signal during a mode 2 interval causes shift to mode 6. As may be noted adjacent the magnetic drum in FIGURE 1B, gate 298 is operated by the coincidence of the COMP A and M6 mode signals. This allows the last message number, which in the present example being described was 0000, to be read out of the drum and entered into shift register 274. Accordingly, the first four bits of gate 296 now receive the binary signals representing the last message number, while the last two bits thereof still receive the voice recognition unit output signals. By reference to FIGURES 2 and 3, it will be recalled that the sixth playback signal $Pb6$ sensed by gate 146 during the readout of the last message number through gate 298, causes the equipment to shift to mode 7.

During mode 7, the character counter 288 is continuously updated by the inputs received from drum counter 148, until the output of the character counter is the same as the other input to coincidence gate 296. The latter input represents the contents of the last message and answer thereto, specifically the last message number and the decoded answer in machine language. Upon obtaining coincidence, gate 296 generates the coincidence signal designated COMP B, which in turn causes the equipment to shift into mode 3, as previously described. In FIGURE 1B, the COMP B signal in conjunction with the M3 mode signal, opens gate 300 at the proper time, to readout from the drum data track 65 the number of the next message to be transferred to the person calling in.

It will be appreciated from the foregoing description that data track 65 on the drum not only stores the status of each conversation by storing the number of the last message in the proper place on the track, i.e., in a place reserved for the LMU to which that message is transferred, but also stores the program which the machine is to follow, based upon the answers received and understood. This is, as will be recalled by reference to the various messages and possible answers thereto set forth in an exemplary manner above, each new message from the machine is based on the contents of the last message, which contents is designated by a number, in conjunction with the answer as understood.

The program recorded on data track 65 is such as to include every possible combination of messages and answers which the machine can handle. The pre-recorded program is actually a recording of different message numbers at different angular positions around the data track 65. The time occurrence of the COMP B signal determines which of those angular positions is selected for readout of the next message number to be recorded therein, and it will be appreciated that the time occurrence of the COMP B signal is determined in accordance with the last message number plus the answer to that message.

As the next message number is being readout, gate 146 determines when the sixth bit time occurs, causing a P*b6* output signal on line 150, which shifts the machine into mode 1. The same cycle of operations previously described beginning with mode 1 through modes 5, 4, 0, 2, 6, 7, 3 and back to mode 1 is accomplished repeatedly until the last message of the group is transferred out, as for example "Thanks for calling," during which the machine reverts to its waiting mode of operation designated mode 0, going through modes 5 and 4 as previously described.

If it is desired to write a new program into the magnetic drum, FIGURES 2 and 3 indicate that the equipment is shifted from mode 0 into mode 5 upon occurrence to a WNP signal. During mode 5 then, shift register 274 may be loaded in any desirable manner along with the placing of appropriate signals on the voice recognition unit output lines on 78 and 80. Character counter 288 is continuously updated as previously described, upon coincidence in gate 296 of the counter outputs with the other inputs to that gate a COMP B signal is generated and delivered to gate 302. This gate, which is otherwise enabled by the WNP signal transfers the number in the shift register 274 to the proper position along data track 65.

*Summary*

From the foregoing description, it is apparent that there has been described a detailed embodiment of the present invention. That embodiment relates to a telephone conversation machine which is mainly an electronic device that receives, stores, updates and dispenses audio information in conversation form via the office or household telephone. The equipment is unique with respect to other telephone devices in that it carries on a complete conversation with the caller automatically and may handle many different simultaneous conversations. In summary, the machine or equipment includes a central storage unit 50, which is an audio storage device containing all possible messages to be used by the machine. This unit has the capability of transferring these message at high speed, for example at 16 times real time. Though no way is shown, the messages in the central storage unit 50 may be readily changed in a manner well known to the art. The detailed equipment also includes a plurality of line monitoring units designated 26 in FIGURE 1 and described in detail in FIGURE 5. These are dual speed buffers which accept messages from the central storage unit 50 at high speed, transfer messages at real speed to the caller, record customer return statements, and playback those statements to the voice recognition unit 48. Preferably, both the central storage unit and line monitoring units are dual speed tape loops.

Also in the equipment is an LMU sequencing unit 34 which interrogates the LMU's to determine which telephone lines are activated and which have completed answers. This unit also controls the sequence of messages to and replies from each telephone line.

The voice recognition unit 48 accepts a customer's reply in audio form from an LMU and decodes it to machine language. Further in the equipment is a control system which includes a storage unit such as the magnetic drum 59. This drum is utilized for timing purposes, and also for storing the status of each conversation and the program that the machine is to follow, based upon the statements received from the customer.

In review as to operation, when a telephone line is activated such as by the high level it carries when a telephone receiver connected to it is raised, the equipment jumps from its resting mode 0 to mode 1 which transfers an initial message at high speed from the central storage unit 50 to the line monitoring unit 26 that is associated with the calling telephone. The tape 32 in the LMU receiving that message is moved at 16 times real speed, for the message is transferred from the central storage unit at that speed.

Upon completion of the message transfer, the number of that message is recorded on the magnetic drum in the character position associated with the LMU that just received the message. This LMU now switches to low speed and the initial message is played out over the telephone line to the customer at real time. In the existing embodiment herein described, the messages from the machine generally consist of a statement followed by a question requiring a "Yes" or "No" answer. Of course, the principle of the present invention extends to a much greater choice of types of messages and statements.

The customer's "Yes" or "No" answer is recorded on the LMU tape loop 32 in real time. At the end of the answer the LMU tape loop is moved at high speed in order to position the answer near the playback head.

The LMU sequencing unit 34 acts like an electronic stepping switch. It constantly interrogates the LMU's to check if a customer's answer has been completed. When the LMU sequencing unit finds a customer's answer ready, it activates that LMU and plays back that recorded answer to the voice recognition unit 48. The voice recognition unit determines if the answer is "Yes" or "No" or "Not Yes or No," and this information along with the last message number that was previously stored on the drum is utilized to determine the location on the drum of the next message number. With a readout from the drum of that number, the central storage unit is activated and that number is employed to select the next message to be transferred at high speed to the LMU in question. This completes the basic cycle of operation of the equipment. In general, the operation is a series of these basic cycles, which when tied together produce an intelligent conversation. The course of conversation is determined by the prerecorded drum program and the customer's answers. The next message to the customer is determined in the program by the last message number and the customer's answer. In other words, the last message number in conjunction with a "Yes" answer would call for one given message, while that same last message number with a "No" answer would call for another. In this manner, and with the use of a magnetic drum to store the last message number to each LMU, any number of telephone lines may be involved in conversation with the equipment simultaneously.

In the foregoing description, a voice recognition unit 48 has generally been included. However, as previously indicated, it is emphasized that such a unit may be replaced by a human operator, who listens to the incoming statement and operates switches, for example switches of the nature of flip-flops 126 and 128 in FIGURE 4, to provide output signals, such as those on lines 78 and 80, which reflect the understanding of the statements received from the caller.

Still numerous other modifications of the invention will become apparent to one of ordinary skill in the art upon reading the foregoing disclosure. During such a reading, it will be evident that this invention has provided a unique method and equipment for accomplishing the objects and advantages herein stated. Still other objects and advantages, and even further modifications, will be apparent from this disclosure. It is to be understood, however, that the foregoing disclosure is to be considered exemplary and not limitative, the scope of the invention being defined by the following claims.

What is claimed is:

1. Equipment for conversing with at least one person whose verbal statements are received by the equipment over a link, comprising:

means for distinguishing between at least two of said statements which respectively correctly convey the contents intended by the person conversing with said equipment and for providing at least two unique output signals which respectively correspond to said two statements, means for selectively supplying at least one of a plurality of audio messages to said person via said link in accordance with said output signals.

2. Equipment as in claim 1 wherein said message supplying means includes means for selecting the next message to be supplied to said link, and means for rendering said selecting means responsive to output signals indicative of the recognition of a statement replying to the last message as aforesaid and also to a signal indicative of the contents of that last message.

3. Equipment as in claim 1 wherein said statements recognizing means includes voice recognition means for effecting said recognition.

4. Equipment for communicating with at least one device the outputs of which are received by the equipment over a link comprising:

means for recognizing said outputs and providing signals indicative thereof, means for selectively supplying at least one of a plurality of audio messages to said device via said link in accordance with said signals, and said message supplying means including means for selecting the next message to be supplied to said link, and means rendering said selecting means responsive to signals indicative of the recognition of an output replying to the last message as aforesaid and also a signal indicative to the contents of that last message.

5. Equipment for conversing via a link which carries statements into the equipment, comprising:

means for conveying said statements to a point, means located at said point for distinguishing between at least two of said statements which respectively correctly convey the contents intended by the person conversing with said equipment and for providing at least two unique output signals to said two statements, means for selectively supplying at least one of a plurality of messages to said link in acordance with the said output signals.

6. Equipment as in claim 5 including:

statement determination means at said point for recognizing any one of a plurality of said statements and for uniquely indicating the recognition of different ones of said statements to said output signal providing means.

7. Equipment for conversing via a link which carries statements into the equipment, comprising:

statement determination means for distinguishing between at least two of said statements which respecively correctly convey the contents intended by the person conversing with said equipment and for providing at least two unique output signals which respectively correspond to said two statements, means for selectively supplying at least one of a plurality of messages to said link in accordance with the said unique indications.

8. Equipment for conversing via a link which carries audio statements into the equipment, comprising:

means for conveying to a party at a predetermined point statements in audio form so that said party can distinguish between at least two of said statements which respectively correctly convey the contents intended by the person conversing with said equipment and for providing at least two output signals which respectively correspond to said two statements, means operable by said person for providing output signals indicative of the understanding by said person of said statements, and means for selectively supplying at least one of a plurality of messages to said link in accordance with the said unique output signals.

9. Equipment for conversing via a plurality of links which when respectively activated carry statements in real time into the equipment, comprising:

means for monitoring and interrogating each of said links to determine which link is activated and when a statement therefrom is complete, means for receiving statements from an activated link in real time and, upon receipt of a first signal, conveying same to a point, means located at said point for recognizing said statements and providing output signals indicative thereof, means for selectively supplying at least one of a plurality of messages to receiving means for said activated link in accordance with said output signals, means operative upon receipt of a second signal for effecting said message supply into the receiving means as aforesaid at a speed substantially greater than real time, means for transforming said messages from said receiving means to said activated link in real time, and means operative in response to the determination by said monitoring and interrogating means of which link is activated and has completed statements in said receiving means for generating said first and second signals.

10. Equipment for conversing via a plurality of links which when respectively activated carry statements in real time into the equipment, comprising:

a plurality of monitoring means respectively for said links and including respective link activation sensing means, statement complete sensing means, and dual speed recording means, scanning means for sequentially interrogating the outputs of both said sensing means and stopping its scanning for a predetermined time upon determining which of said monitoring means is sensing activation of its link or completion of a statement carried thereby and recorded by said recording means at real time, means for transferring messages to said recording means selectively and at a speed substantially greater than real time, means for transferring said recorded messages to a link requiring same as indicated by said sensing and interrogating means, means for transferring statement from a link via said recording means in real time, and means for recognizing said statements and providing unique output signals indicative of such transferred statements to cause the aforesaid selective transfer of said messages.

11. Equipment for conversing with at least one person whose verbal statements are received by the equipment on an electrical line, comprising:

means for storing a plurality of audio messages, means for transferring any selected one of said stored messages to said line to effect the aforesaid conversing, means for recognizing any one of a plurality of said verbal statements, and means operative in accordance with each such recognized statement for selecting an appropriate one of said stored messages for transfer to said person via said line by said transferring means as aforesaid.

12. Equipment as in claim 11 wherein said selecting means includes programming means having a prerecorded program for determining which one of said messages is next to be transferred as aforesaid in response to the combination of the last message transferred and the understanding by the said understanding means of the statement next following that last message.

13. Equipment as in claim 12 wherein said recognizing means provides unique output signals for the recognizing of different statements and also for its inability to recognize any said received statement.

14. Equipment as in claim 12 wherein said programming means includes,
- a continuously movable record member having a track of successive areas which are reserved for respective designations of said messages,
- means for recording in any one of said areas the designation of the last message transferred as aforesaid,
- means for reading out from that track area the message designation stored therein,
- means for comparing that last message designation in conjunction with a recognized statement with the instant track position to find coincidence therebetween, and
- means responsive to such coincidence for reading out from said programming means the designation of the next message to be selected.

15. Equipment for conversing, by use of stored audio messages, with anyone of a plurality of persons whose respective verbal statements are received by the equipment on respective electrical lines, comprising:
- means for storing a plurality of said messages, each message having a unique designation,
- means for sensing a statement coming in on any one of said lines,
- means for transferring any selected one of said stored messages to any one of the lines on which an incoming statement is sensed,
- control means having a prerecorded program for selecting in response to the last prior message transferred to the said line in question in conjunction with the statement therefrom, which of said messages is to be selected and transferred next to that line, said control means including means for selecting the message designated the initial one, upon the initial sensing of an incoming statement on the line in question, and
- means for recognizing any one of a plurality of audio statements for recognizing sensed statements and uniquely providing output signals indicative thereof to said control means.

16. Telephone conversation equipment for conversing, by use of stored audio messages, with any one of a plurality of persons whose verbal statements are received by the equipment over respective electrical lines from respective telephones, comprising:
- a plurality of line monitoring units respectively for said lines,
- means for storing a plurality of said messages, each message having a unique number designation,
- means for effectively scanning said line monitoring units to sense an incoming said statement and stop the scanning while that statement arrives on the associated one of the said electrical lines,
- each said line monitoring unit having a respective record on which incoming statements and outgoing messages may be recorded,
- means for transferring any selected one of said stored messages to said record at a speed above real speed,
- said record being movable at real speed for receiving said statements from the associated line and for transferring those statements internally of the equipment and for transferring messages on said record to the associated line,
- means for recognizing any one of a plurality of audio statements for recognizing the statements transferred to it from said record, and
- means including programming means for recording and playing back the last message number and also playing back the next message number selected in accordance with the output of the said recognizing means in conjunction with the number of the last message selected.

17. A telephone conversation machine for conversing, by use of its stored audio messages, with a plurality of persons whose verbal statements are received by the machine over respective telephone lines which also carry the said messages to said persons respectively, comprising:
- means for storing a plurality of said messages, each of said messages being uniquely designated,
- means for transferring any selected one of said stored messages to any one of said telephone lines according to which has carried a said statement associated with the message selected,
- means for recognizing any one of a plurality of said verbal statements, and
- means including record means having a prerecorded program designating which of said messages comes next, on the basis of the number of the last message transferred to the same line and the subsequent statement therefrom, for selecting the programmed one of said stored messages for transfer thereof to the person at the other end of the said line in question.

18. A telephone conversation machine as in claim 17 wherein said recognizing means discriminates between the words "Yes" and "No" and provides different output signals for those different recognized words, the comparison of the record position with the number of the last message and those signals being different therefor for the yes and no answers received as the verbal statements from the person on the other end of the telephone line in question.

19. A telephone conversation machine as in claim 18 wherein said recognizing means further categorizes said statements into an "Other" category besides the said "Yes" and "No" answers, and provides a third unique signal to said second coincidence gate to effect therefrom a signal designating by its time of occurrence the next message to be transferred as aforesaid.

20. Equipment for conversing, by use of stored audio messages, with at least one person whose verbal statements are received by the equipment on an electrical line, comprising:
- means for monitoring that line including a movable record member for recording said statements as they arrive over said electrical line,
- means for transferring said statements from said record to a station for purposes of understanding the statement,
- means for storing a plurality of said messages,
- means for transferring any selected one of said stored messages to said record for playback therefrom to said electrical line,
- and programming means including means for receiving from said station signals representing the recognition of each said statement and for receiving signals representing the last message transferred to select the appropriate one of said stored messages for transfer next to said record for playback to said person as aforesaid.

References Cited by the Examiner

UNITED STATES PATENTS

| | | | |
|---|---|---|---|
| 2,519,568 | 8/1950 | Handschin | 179—100.1 |
| 2,669,605 | 2/1954 | Lee | 179—100.2 |
| 3,133,268 | 5/1964 | Avakian et al. | 179—1 |
| 3,176,073 | 3/1965 | Samuelson et al. | 179—1 |
| 3,253,263 | 5/1966 | Lee et al. | 340—174 |

OTHER REFERENCES

1958 Techniques of Magnetic Recording, Tall TK5981 T35 C.3, MacMillan Company, pp. (384–5), and pp. (399–403).

BERNARD KONICK, *Primary Examiner.*

IRVING SRAGOW, *Examiner.*

G. LIEBERSTEIN, *Assistant Examiner.*